US012697595B1

(12) United States Patent
Xu et al.

(10) Patent No.: US 12,697,595 B1
(45) Date of Patent: Aug. 4, 2026

(54) AEROGEL THERMAL INSULATION MAT AND PREPARATION METHOD THEREOF

(71) Applicant: SKYBOYS (HANGZHOU) TECHNOLOGY CO., LTD, Hangzhou (CN)

(72) Inventors: Xiran Xu, Hangzhou (CN); Bo Wu, Hangzhou (CN)

(73) Assignee: SKYBOYS (HANGZHOU) TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 19/533,404

(22) Filed: Feb. 9, 2026

(30) Foreign Application Priority Data

Nov. 13, 2025 (CN) .......................... 202511664140.3

(51) Int. Cl.
B01J 13/00 (2006.01)
B32B 5/18 (2006.01)
B32B 38/08 (2006.01)

(52) U.S. Cl.
CPC ............. B01J 13/0091 (2013.01); B32B 5/18 (2013.01); B32B 38/08 (2013.01); *B32B 2307/3065* (2013.01)

(58) Field of Classification Search
CPC ..................... B01J 13/0091; B32B 2307/3065
See application file for complete search history.

(56) References Cited

U.S. PATENT DOCUMENTS

2018/0010726 A1* 1/2018 Kim ........................ C09D 1/00

FOREIGN PATENT DOCUMENTS

| CN | 106366739 A | * 2/2017 | ............... C09D 5/14 |
| CN | 110922095 A | * 3/2020 | ........... C04B 26/122 |

OTHER PUBLICATIONS

Liu, "Novel three-dimensional halloysite nanotubes/silica composite aerogels with enhanced mechanical strength and low thermal conductivity prepared at ambient pressure," 2016, J. Sol-Gel Sci. Technol. 80:651-659. (Year: 2016).*
CN110922095, machine translation (Year: 2021).*
CN106366739, machine translation. (Year: 2017).*

* cited by examiner

*Primary Examiner* — Robert A Vetere
(74) *Attorney, Agent, or Firm* — Cooper Legal Group, LLC

(57) ABSTRACT

The present application discloses an aerogel thermal insulation mat and a preparation method thereof. The thermal insulation mat is prepared by coating a surface of a fiber mat with a composite slurry, followed by sintering. The composite slurry is prepared from raw materials including a functionalized silica aerogel, an inorganic silicate-modified resin, chopped glass fibers and a dual coupling agent in specific percents by weight. The dual coupling agent allows the chopped glass fibers and the functionalized silica aerogel to form an interwoven network structure, thereby enhancing the interfacial bonding force. The functionalized silica aerogel reduces water absorption and improves structural compactness. The thermal insulation mat obtained exhibits optimized mechanical properties and enhanced tear resistance; reinforced structural stability and significantly reduced powder shedding rate; and excellent water resistance with a three-dimensional protective structure formed, thereby providing a technical support for the application in complex environments.

14 Claims, No Drawings

AEROGEL THERMAL INSULATION MAT AND PREPARATION METHOD THEREOF

CROSS-REFERENCE TO RELATED APPLICATION

The present application claims the priority and benefit of Chinese patent application No. 202511664140.3, filed on Nov. 13, 2025. The entirety of Chinese patent application No. 202511664140.3 is hereby incorporated by reference herein and made a part of this specification.

TECHNICAL FIELD

The present application relates to the technical field of thermal insulation materials and, in particular, to an aerogel thermal insulation mat and a preparation method thereof.

BACKGROUND ART

As a functional material with both nanoporous structure and low thermal conductivity, the glass fiber aerogel thermal insulation mat has shown important application value in the fields such as building energy-saving thermal insulation and industrial equipment thermal insulation. However, since current technologies still face critical bottlenecks in terms of material performance optimization and preparation process control, the comprehensive performance of the glass fiber aerogel thermal insulation mat cannot meet the service requirements under complex working conditions, with deficiencies being particularly prominent in terms of mechanical strength, structural stability, and water resistance.

Known glass fiber aerogel thermal insulation mats generally face the problem of insufficient mechanical properties caused by weak interfacial bonding. The conventional processes treat glass fiber surfaces with a single silane coupling agent, which can only achieve limited bonding between fibers and the resin matrix. However, due to insufficient matching of acidic functional groups at the interface between the aerogel particles and fibers, the interfacial shear strength is weak, resulting in generally low overall compressive strength of the material. This defect directly leads to the interlayer delamination of the product during transportation vibration, cracking along the fiber interface during construction bending, and even structural failure in scenarios that require conformal deformation such as thermal insulation for pipes. In addition, the problem of uneven dispersion of chopped glass fibers further exacerbates the strength deficiency. Insufficient mechanical strength also directly leads to frequent powder shedding. Due to poor bonding between aerogel particles and the resin matrix, aerogel particles are prone to detachment under vibration or airflow impact during handling, installation, or long-term use. This will not only pollute the construction environment and endanger the health of operators, but will also gradually reduce the effective thickness of the thermal insulation mat and destroy the nanoporous structure, and ultimately leads to a gradual increase in thermal conductivity and a significant decrease in thermal insulation performance.

In terms of waterproof performance, known treatment processes also have obvious shortcomings. Although surface spraying of an silane solution along can form a hydrophobic film, the film has poor toughness and is prone to cracking under mechanical stress. More importantly, moisture easily penetrates into the interior through microcracks at the fiber-aerogel interface, such that the aerogel absorbs moisture, expands, and collapses structurally, thereby further weakening the strength of the material.

In summary, known glass fiber aerogel thermal insulation mats have systemic deficiencies in terms of interfacial bonding strength, fiber dispersion, pore sealing effect and waterproofing treatment process. It is urgent to solve key problems such as insufficient mechanical properties, high powder shedding rate, and poor waterproof durability by means of material formulation optimization and preparation process innovation, so as to promote the engineering application of this material.

SUMMARY

The present application provides a composite slurry to solve the above technical problems.

In order to solve the above technical problems, the present application provides a composite slurry, which includes the following components in percent by weight:

18%-22% of a functionalized silica aerogel;

32%-38% of an inorganic silicate-modified resin;

3%-5% of chopped glass fibers;

0.3%-0.5% of a dual coupling agent;

0.3%-0.5% of a nanoclay dispersion;

0.1%-0.3% of a defoamer;

0.2%-0.6% of a wetting agent;

0.5%-1.0% of methyltrimethoxysilane and/or vinyltrimethoxysilane; and a balance of water.

Further, the dual coupling agent is prepared from a silane coupling agent and a titanate coupling agent at a weight ratio of (1-3):1.

The addition of the chopped glass fiber in synergy with the dual coupling agent enhances the interfacial bonding. Silane couples the chopped glass fiber, and the titanate couples aerogel, thereby improving the interfacial shear strength and compressive strength and solving the problem of insufficient mechanical strength. The interwoven network structure improves material integrity, enhances tear resistance and lowers the risk of fracture. 0.5%-1.0% of the methyltrimethoxysilane and/or vinyltrimethoxysilane, added to the slurry, penetrates into the interior to form Si—O—Si bonds. The internal hydrophobic framework fundamentally prevents moisture from penetrating into the aerogel pores.

Further, the dual coupling agent is prepared from γ-aminopropyltriethoxysilane and pyrophosphate-type monoalkoxy titanate at a weight ratio of 2:1.

Further, the inorganic silicate-modified resin is a sodium silicate-modified phenolic resin.

Further, the functionalized silica aerogel is prepared by using β-CD, a silane coupling agent, silica sol, aminoadamantane and halloysite nanotubes (HNTs).

Further, a mass ratio of the aminoadamantane to the silane coupling agent to the silica sol is 1:1:(20-30); a mass ratio of the β-CD to the halloysite nanotubes is 1:(20-30).

The inorganic silicate-modified resin enhances the chemical cross-linking between resin and aerogel, improves the interfacial bonding strength, reduces interlayer delamination, enhances material toughness, and lowers the risk of fracture caused by brittleness.

Further, a method for preparing the functionalized silica aerogel includes the following steps:

S1, premixing the aminoadamantane and the silane coupling agent thoroughly to obtain a premix; then, adding the premix to the silica sol and stirring to form an "aminoadamantane-silica sol" complex;

S2, preparing a saturated aqueous solution of β-CD, and mixing the saturated aqueous solution of β-CD with halloysite nanotubes to form a "β-CD-HNTs" complex; and S3, mixing the "aminoadamantane-silica sol" complex with the "β-CD-HNTs" complex and stirring to form a wet gel; and drying the wet gel to obtain the functionalized silica aerogel.

The method for preparing the functionalized silica aerogel constructs a dynamically reversible cross-linked network inside the aerogel by virtue of the host-guest inclusion effect of the β-CD and the aminoadamantane. The cyclic cavity of the β-CD and aminoadamantane molecules form a "molecular switch" structure by means of non-covalent bonds; the network the network dynamically dissociates under the action of an external force to absorb energy, and rebonds when the external force is removed, giving the material with self-healing capability. After the halloysite nanotubes are coated with the β-CD, the halloysite nanotubes and the β-CD are cross-linked with the aminoadamantane-modified particles in the silica sol by hydrogen bonds to form a "glass fiber-β-CD-HNTs-aminoadamantane-silica sol" multi-level anchoring structure, thereby improving the interfacial bonding strength.

As an embodiment of the present application, raw materials for preparing the functionalized silica aerogel include:

halloysite nanotubes;

dodecyl methacrylate and/or pentafluorophenyl methacrylate; and silica sol with a $SiO_2$ content of 25%.

Further, the raw materials for preparing the functionalized silica aerogel further include lightweight microspheres.

Further, the lightweight microspheres include one or more of hollow glass microspheres, hollow silica microspheres, hollow ceramic microspheres or phenolic resin hollow microspheres.

Further, a particle size of the lightweight microspheresis 100 μm to 350 μm.

Further, a density of the lightweight microspheres is 0.1 g/cm³ to 0.4 g/cm³.

Further, the functionalized silica aerogel is prepared from copolymer-modified halloysite nanotubes and silica sol.

Further, in the functionalized silica aerogel, the copolymer-modified halloysite nanotubes are connected to the silica sol by Si—O—Si bonding.

Further, pentafluorophenyl ester groups and dodecyl ester groups are grafted onto a surface of the copolymer-modified halloysite nanotubes.

Further, the copolymer-modified halloysite nanotubes are modified by dodecyl methacrylate and pentafluorophenyl methacrylate.

Further, a method for preparing the copolymer-modified halloysite nanotubes includes the following steps: adding the dodecyl methacrylate and/or pentafluorophenyl methacrylate, an organic solvent and halloysite nanotubes into a reaction vessel, adding an initiator, controlling a reaction temperature to 70-80° C. for reaction with stirring for 4-8 h, cooling, collecting filter residues by filtration, and washing and drying the filter residues to obtain the copolymer-modified halloysite nanotubes.

Further, the halloysite nanotubes are coupling-modified halloysite nanotubes.

Further, a preparation process of the coupling-modified halloysite nanotubes includes the following steps: adding a silane coupling agent, water and pretreated halloysite nanotubes into a reaction vessel, adjusting a pH value of a resulting mixture to 9-10, and reacting at 60-80° C. for 2-3 h, then adjusting the pH value to neutral, cooling the reaction system, collecting filter residues by filtration, and washing and drying the filter residues to obtain the coupling-modified halloysite nanotubes.

Further, a weight ratio of the silane coupling agent to the water to the pretreated halloysite nanotubes is (1-1.5):100:(9-14).

Further, a preparation process of the pretreated halloysite nanotubes includes the following steps: mixing halloysite nanotubes and a urea solution with a concentration of 20 wt % at a weight ratio of 1:8-10, performing ultrasonic treatment to obtain a mixture and leaving the mixture to stand still, and then adding a sulfuric acid solution with a concentration of 5 wt % to obtain a mixed solution, leaving the mixed solution to stand still, filtering the mixed solution to obtain a solid, and drying the solid to obtain the pretreated halloysite nanotubes, wherein a weight ratio of the sulfuric acid solution to the halloysite nanotubes is 5:1.

Further, a method for preparing the composite slurry includes the following steps:

T1, preparing raw materials according to the weight percent of each component;

T2, mixing and dispersing the water, the inorganic silicate-modified resin and the functionalized silica aerogel thoroughly to form a homogeneous base material;

T3, adding the chopped glass fibers and the nanoclay dispersion to the homogeneous base material, performing shear dispersion, and then adding the dual coupling agent and stirring thoroughly to obtain a mixture; and T4, adding the methyltrimethoxysilane and/or vinyltrimethoxysilane, the defoamer and the wetting agent to the mixture, and adjusting a viscosity of of a resulting slurry to 25-30 mPa·s and a pH value of the resulting slurry to 9-9.5 to obtain the composite slurry.

According to the preparation for preparing the composite slurry, high-shear dispersion is performed to realize uniform dispersion of fibers; the addition of the coupling agent ensures sufficient interfacial reaction and improves the degree of bonding.

The present application further provides an aerogel thermal insulation mat, which is prepared by coating the above-described composite slurry on a fiber mat, followed by sintering.

Further, the fiber mat is one of a glass fiber mat, a carbon fiber mat, a nickel fiber mat, a stainless steel fiber mat, an aluminum silicate fiber mat, a ceramic fiber mat, an alumina fiber mat, a basalt fiber mat or a polyacrylonitrile fiber mat.

Due to its good flexibility, the glass fiber mat is suitable for scenarios requiring bending, molding or serving as a reinforcement layer, such as thermal insulation, sound insulation, reinforced composite materials, filtration and environmental protection, and architectural decoration. The glass fiber mat exhibits outstanding performance especially in fields requiring corrosion resistance, impact resistance and light weight.

Due to its relatively high rigidity and high-temperature resistance, the ceramic fiber mat is applicable to extreme environments with high temperature, high pressure, corrosion resistance, fire prevention and thermal insulation, such as industrial kilns, aerospace, sealing of high-temperature equipment, protective equipment and energy-saving materials. The ceramic fiber mat performs excellently especially in scenarios subject to high temperature, mechanical vibration and chemical corrosion.

The glass fiber mat and the ceramic fiber mat are complementary to each other, meeting the extensive demands ranging from daily construction to cutting-edge technology.

Further, a thickness of the fiber mat is 0.5 mm to 500 mm.

The present application further provides a method for preparing the aerogel thermal insulation mat described above. The method includes the following steps:

(1) pre-wetting the fiber mat to obtain a pre-wet fiber mat;

(2) placing the pre-wet fiber mat in an environment with a vacuum degree of −0.08 MPa to −0.1 MPa, and impregnating the composite slurry so that a penetration amount of the composite slurry reaches pores of the fiber mat; then controlling a coating amount of the composite slurry on a surface of the fiber mat to be 1000-1200 $g/m^2 \cdot mm$ by means of extrusion to obtain an impregnated fiber mat;

(3) sintering the impregnated fiber mat;

(4) performing surface hydrophobization treatment; and (5) performing drying to obtain the aerogel thermal insulation mat.

According to the method for preparing the aerogel thermal insulation mat, it is ensured that the composite slurry fills the pores of the fiber mat by means of impregnation, and the surface adsorption amount is accurately controlled to avoid local accumulation; gradient sintering eliminates micron-scale pores, increases the compactness, and simultaneously optimizes the compressive strength and thermal insulation performance.

Further, the surface hydrophobization treatment in the step (4) uses an emulsion containing a mixture of silane and siloxane (SILRES® BS4004 solution) with a volume concentration of 5% as a hydrophobing agent. By adopting the above technical solution, a high-toughness hydrophobic film can be formed to cover micro-cracks in the surface of the aerogel thermal insulation mat, prevent external moisture from intruding, and further enhance the wear resistance of the surface of the aerogel thermal insulation mat, thereby further reducing the risk of powder shedding.

Further, the present application provides another method for preparing the aerogel thermal insulation mat. The method includes the following steps: coating the composite slurry on a surface of the fiber mat, leaving the fiber mat to stand still so that the fiber mat stably adsorbs the composite slurry, and performing drying to obtain the aerogel thermal insulation mat.

Further, a coating amount of the composite slurry on the surface of the fiber mat is 0.5 $kg/m^2$ to 50 $kg/m^2$.

By means of the innovation of material formula and process, the present application effectively improves the comprehensive performance of the aerogel thermal insulation mat:

1. Optimization of mechanical properties: The use of a dual coupling agent system significantly enhances the interfacial bonding force between glass fibers and aerogel, improves the compressive strength and tear resistance of the material, and ameliorates the problems of easy fracture and interlayer delamination in the conventional process.

2. The host-guest inclusion interaction between β-CD and aminoadamantane is used to construct a dynamic reversible cross-linked network inside the aerogel. The cyclic cavity of the β-CD and aminoadamantane molecules form a "molecular switch" structure by means of non-covalent bonds; the network the network dynamically dissociates under the action of an external force to absorb energy, and rebonds when the external force is removed, giving the material with self-healing capability. After the halloysite nanotubes are coated with the β-CD, the halloysite nanotubes and the β-CD are cross-linked with the aminoadamantane-modified particles in the silica sol by hydrogen bonds to form a "glass fiber-β-CD-HNTs-aminoadamantane-silica sol" multi-level anchoring structure, thereby improving the interfacial bonding strength.

3. Improvement of structural stability: By means of the high filling of nano-fillers and the gradient pressure sintering process, the pore defects of the aerogel are reduced, the risk of particle detachment is lowered, the powder shedding rate is significantly decreased, and the stability of thermal insulation performance is guaranteed.

4. Breakthrough in water resistance: Methyltrimethoxysilane (0.5%-1.0%), added to the slurry, penetrates into the aerogel and forms siloxane bonds. An internal hydrophobic framework is constructed to fundamentally prevent moisture from penetrating into the aerogel pores. The internal hydrophobic framework works together with the surface hydrophobic film to achieve a "dual (internal and external) protection effect", which reduces structural damage and powder shedding caused by water absorption.

5. Dispersion and process compatibility: An innovative dispersion process and gradient temperature rise control are adopted to optimize the uniformity of fiber dispersion, avoid the adverse effects of high-temperature processes on material performance, and improve the stability and reliability of the preparation process.

The above improvements systematically solve the technical bottlenecks of the prior art by means of material interface control and the collaborative optimization of processes, and provide technical support for the application of the product in complex environments.

DETAILED DESCRIPTION

To elaborate on the technical solutions of the invention in more detail, specific examples are provided below to verify the technical effects.

Sources of experimental raw materials in the Examples and Comparative Examples of the present application:

β-CD (β-cyclodextrin): Qufu Tianli Pharmaceutical Excipients Co., Ltd.;

γ-aminopropyltriethoxysilane (KH-550): Nanjing Shuguang Chemical Group Co., Ltd.;

γ-methacryloxypropyltrimethoxysilane (KH-570): Nanjing Shuguang Chemical Group Co., Ltd.;

Aminoadamantane: Sichuan Zhongbang New Material Co., Ltd.;

Halloysite nanotubes (HNTs): Hefei Kejing Materials Technology Co., Ltd.;

Silica sol: Zhejiang Yuda Chemical Co., Ltd.;

Chopped glass fibers: Chongqing Polycomp International Corporation;

Titanate coupling agent (TC-114): Nanjing Shuguang Chemical Group Co., Ltd.;

Nano montmorillonite dispersion (montmorillonite, solid content: 20%): Zhejiang Fenghong New Material Co., Ltd.;

Methyltrimethoxysilane: Hubei BlueSky New Material Inc.;

SILRES® BS4004 hydrophobing agent: Wacker Chemie (China) Co., Ltd.;

Dodecyl methacrylate: Sigma-Aldrich, CAS No. 142-90-5;

Pentafluorophenyl methacrylate: TCI (Shanghai) Chemical Industry Development Co., Ltd., CAS No. 13642-97-2;

Inorganic silicate-modified resin (phenolic modified sodium silicate resin): homemade.

In the presence of an acidic catalyst, the phenolic hydroxyl groups of the phenolic resin undergo a condensation reaction with the silicon hydroxyl groups of sodium silicate to form Si—O—C covalent bonds. The following raw materials, in parts by weight, were used: 80 parts of sodium silicate, 25 parts of phenolic resin, 2 parts of hydrochloric acid (catalyst, concentration: 10%), an appropriate amount of water (for viscosity adjustment). Equipment: reactor (equipped with a reflux condenser), high-shear emulsifier, pH meter.

Operation procedures:

1. Preparation of Acid-Modified Sodium Silicate:

Sodium silicate was heated and stirred in a 60° C. water bath, and ethanol was then slowly added to dilute the sodium silicate to a solid content of 40%. Then, the ethanol solution of sodium silicate was poured into a reactor, hydrochloric acid was dropwise added with stirring, and the pH of the mixed solution was adjusted to fall within a range of 6.0 to 6.5, and the sodium silicate was partially acidified to form nano-silica sol.

2. Phenolic Resin Dispersion:

Phenolic resin was added and then high-shear dispersion was performed at 1000 r/min for 15 min to form a homogeneous emulsion (with the particle size of phenolic resin being less than 5 μm).

3. Condensation Reaction:

The reaction system was heated to 70° C. and held for 3 h for reaction. During the reaction, the hydroxymethyl groups (—$CH_2OH$) of the phenolic resin condensed with silicon hydroxyl groups (—SiOH) to release water molecules, leading to a gradual increase in the viscosity of the system.

4. Neutralization and Filtration:

The pH value was adjusted with a sodium hydroxide solution to be 8.5 to 9.0 (weakly alkaline stable range), followed by filtration to remove unreacted particles, thus obtaining the phenolic modified sodium silicate resin.

Example 1 This example provides a glass fiber aerogel thermal insulation mat. The preparation steps are described as follows:

Example 1.1 Preparation of Functionalized Silica Aerogel

The following raw materials, in parts by weight, were used for preparation of the functionalized silica aerogel:

10 parts of β-CD, 10 parts of silane coupling agent KH-570, 250 parts of silica sol (25% $SiO_2$), 10 parts of aminoadamantane and 250 parts of halloysite nanotubes.

Preparation Process:

(1) The aminoadamantane and the silane coupling agent KH-570 were premixed to obtain a premix; the premix was added slowly to the silica sol, a resulting system was heated to 60° C. and held for 2 h with stirring for reaction; during the reaction, the alkoxy groups (—$OCH_3$) of the silane coupling agent condensed with the silicon hydroxyl groups (—SiOH) on the surface of the silica sol, such that the aminoadamantane molecules were grafted to the surface of the silica sol particles to form an "aminoadamantane-silica sol" complex;

(2) A saturated aqueous solution of β-CD was prepared, and halloysite nanotubes were then added to the saturated aqueous solution of β-CD and dispersed with ultrasonic waves to form a "β-CD-HNTs" complex;

(3) The "aminoadamantane-silica sol" complex obtained in the step (1) was mixed with the "β-CD-HNTs" complex to form a wet gel by virtue of the host-guest inclusion interaction between the β-CD and the aminoadamantane; and (4) The wet gel was subjected to low-temperature drying to obtain the functionalized silica aerogel.

Example 1.2 Preparation of Composite Slurry

Raw Material Composition (in Percent by Weight):

20% of the functionalized silica aerogel prepared in Example 1.1;

35% of phenolic modified sodium silicate resin;

4% of chopped glass fibers (length: 0.5-1 mm, aspect ratio: 8);

0.4% of a dual coupling agent (a mixture of KH-550 and titanate coupling agent TC-114 at a weight ratio of 2:1);

0.4% of a nano montmorillonite dispersion;

0.8% of methyltrimethoxysilane;

0.2% of a defoamer (a mixture of TEGO® Foamex844 and TEGO® Foamex857 at a volume ratio of 1:1);

0.3% of a wetting agent: 0.15% of Disponer W-18 and 0.15% of Hydropalat® WE3221; and a balance of water.

Preparation Process:

(1) The water, the phenolic modified sodium silicate resin and the functionalized silica aerogel were mixed, and dispersed at 1600 r/min for 25 min to form a base material;

(2) The chopped glass fibers and the nano montmorillonite dispersion were added to the base material, high-shear dispersion was performed at 1800 r/min for 18 min, and then the dual coupling agent was added and stirred for 12 min;

(3) Finally, the methyltrimethoxysilane, the defoamer and the wetting agent were added, and a viscosity and a pH value of a resulting slurry was adjusted to 28 mPa·s and 9.2 respectively to obtain the composite slurry.

Example 1.3 Preparation of Glass Fiber Aerogel Thermal Insulation Mat

Preparation Process:

(1) Pretreatment of glass fiber mat: The glass fiber mat was immersed into a silane coupling agent KH-550 solution with a mass concentration of 3% for pre-wetting for 20 min, and then dried at 110° C. for 30 min to obtain a pretreated fiber mat.

(2) Vacuum impregnation: The pretreated fiber mat was placed in a vacuum environment with a pressure of −0.08 MPa, and impregnated with the composite slurry prepared in Example 1.2 for 12 min so that a penetration amount of the composite slurry reached 120% of a pore volume of the fiber mat, and then roller extrusion was performed to control a coating amount of the composite slurry on a surface of the fiber mat to 1000 g/m² to obtian an impregnated glass fiber mat.

(3) The impregnated glass fiber mat was subjected to gradient pressure sintering at a heating rate of 8° C./min, with the specific procedure as follows:

first stage: the sintering conditions of 180° C. and 0.5 MPa were held for 20 min to initially cure the resin and fix the fiber positions;

second stage: the sintering conditions of 400° C. and 1.0 MPa were held for 20 min to promote the chemical bonding of the coupling agent with the fiber/aerogel interface; and third stage: the sintering conditions of 700° C. and 2.0 MPa were held for 20 min to increase the compactness to 0.38 g/cm³ and eliminate micron-scale pores to obtian a sintered glass fiber mat.

(4) Hydrophobization treatment

Surface hydrophobization treatment: A hydrophobic solution with a volume concentration of 5% was prepared using the SILRES® BS4004 hydrophobing agent (a mixture of silane and siloxane), and the sintered glass fiber mat was soaked in the hydrophobic solution for 30 min, followed by drying, thus obtaining the glass fiber aerogel thermal insulation mat.

The glass fiber aerogel thermal insulation mat prepared in this example achieves a substantial improvement in mechanical strength, powder shedding reduction and water resistance.

Example 2: This example provides a glass fiber aerogel thermal insulation mat, and the preparation steps are described as follows:

Example 2.1 Preparation of Functionalized Silica Aerogel

The following raw materials, in parts by weight, were used for preparation of the functionalized silica aerogel:

10 parts of β-CD, 10 parts of silane coupling agent KH-570, 220 parts of silica sol (25% SiO₂), 10 parts of aminoadamantane and 280 parts of halloysite nanotubes.

The preparation process is the same as that in Example 1.1.

Example 2.2 Preparation of Composite Slurry

Raw Material Composition (in Percent by Weight):
18% of the functionalized silica aerogel;
38% of phenolic modified sodium silicate resin;
3% of chopped glass fibers (length: 0.5-1 mm, aspect ratio: 8);
0.5% of a dual coupling agent (a mixture of KH-550 and titanate coupling agent TC-114 at a weight ratio of 2:1);
0.3% of a nano montmorillonite dispersion;
0.8% of methyltrimethoxysilane;
0.3% of a defoamer (a mixture of TEGO® Foamex844 and TEGO® Foamex857 at a volume ratio of 1:1);
0.6% of a wetting agent: 0.3% of Disponer W-18 and 0.3% of Hydropalat® WE3221; and
a balance of water.

The preparation process is the same as that in Example 1.2.

Example 2.3 Preparation of Glass Fiber Aerogel Thermal Insulation Mat

The glass fiber aerogel thermal insulation mat was prepared by using the composite slurry prepared in Example 2.2, and the preparation process is the same as that in Example 1.3.

Example 3: This example provides a glass fiber aerogel thermal insulation mat, and the preparation steps are described as follows:

Example 3.1 Preparation of Functionalized Silica Aerogel

The following raw materials, in parts by weight, were used for preparation of the functionalized silica aerogel:

10 parts of β-CD, 10 parts of silane coupling agent KH-570, 280 parts of silica sol (25% SiO₂), 10 parts of aminoadamantane and 220 parts of halloysite nanotubes.

The preparation process is the same as that in Example 1.1.

Example 3.2 Preparation of Composite Slurry

Raw Material Composition (in Percent by Weight):
22% of the functionalized silica aerogel;
32% of phenolic modified sodium silicate resin;
5% of chopped glass fibers (length: 0.5-1 mm, aspect ratio: 8);
0.3% of a dual coupling agent (a mixture of KH-550 and titanate coupling agent TC-114 at a weight ratio of 2:1);
0.3% of a nano montmorillonite dispersion;
0.6% of methyltrimethoxysilane;
0.3% of a defoamer (a mixture of TEGO® Foamex844 and TEGO® Foamex857 at a volume ratio of 1:1);
0.6% of a wetting agent: 0.3% of Disponer W-18 and 0.3% of Hydropalat® WE3221; and
a balance of water.

The preparation process is the same as that in Example 1.2.

Example 3.3 Preparation of Glass Fiber Aerogel Thermal Insulation Mat

The glass fiber aerogel thermal insulation mat was prepared by using the composite slurry prepared in Example 3.2, and the preparation process is the same as that in Example 1.3.

Example 4: This example provides a glass fiber aerogel thermal insulation mat, and the preparation steps are described as follows:

Example 4.1 Preparation of Functionalized Silica Aerogel: The Same as that in Example 1.1

Example 4.2 Preparation of Composite Slurry

The preparation process in Example 4.2 is substantially the same as that in Example 1.2. The difference lies in that, in the preparation process of the composite slurry in Example 4.2, 0.5% of a single coupling agent (KH-570) was used to replace 0.5% of the dual coupling agent (a mixture of KH-550 and titanate coupling agent TC-114 at the weight ratio of 2:1) in Example 1.1.

Example 4.3 Preparation of Glass Fiber Aerogel Thermal Insulation Mat

The glass fiber aerogel thermal insulation mat was prepared by using the composite slurry prepared in Example 4.2, and the preparation process is the same as that in Example 1.3.

Example 5: This example provides a glass fiber aerogel thermal insulation mat, and the preparation steps are described as follows:

Example 5.1 Preparation of Functionalized Silica Aerogel: The Same as that in Example 1.1

Example 5.2 Preparation of Composite Slurry

The preparation process in Example 5.2 is substantially the same as that in Example 1.1. The difference lies in that, in the preparation process of the composite slurry in Example 5.2, methyltrimethoxysilane was not added to the composite slurry and replaced with an equal amount of water, with the remaining raw materials, proportions and preparation steps being the same as those in Example 1.2.

Example 5.3 Preparation of Glass Fiber Aerogel Thermal Insulation Mat

The glass fiber aerogel thermal insulation mat was prepared by using the composite slurry prepared in Example 5.2, and the preparation process is the same as that in Example 1.3.

Example 6: This example provides a glass fiber aerogel thermal insulation mat, and the preparation steps are described as follows:

Example 6.1 Preparation of Functionalized Silica Aerogel

Raw materials, in percent by weight: 5% of halloysite nanotubes, 3% of dodecyl methacrylate, 2% of pentafluorophenyl methacrylate, and a balance of silica sol (25% $SiO_2$).

Preparation Process:

(1) The halloysite nanotubes were mixed with the dodecyl methacrylate and the pentafluorophenyl methacrylate, and ultrasonic dispersion was performed for 30 min to complete surface modification to obtain modified nanotubes;

(2) The modified nanotubes were added to the silica sol and a resulting mixture was stirred thoroughly for gelation; then, aging, methanol solvent exchange and $CO_2$ supercritical drying were performed to obtain the functionalized silica aerogel.

The remaining raw materials and preparation method are the same as those in Example 1.1.

Example 6.2 Preparation of composite slurry: The composite slurry was prepared by using the functionalized silica aerogel prepared in Example 6.1, and the remaining raw materials and preparation steps are the same as those in Example 1.2.

Example 6.3 Preparation of glass fiber aerogel thermal insulation mat: The glass fiber aerogel thermal insulation mat was prepared by using the composite slurry prepared in Example 6.2, and the preparation process is the same as that in Example 1.3.

Example 7: This example provides a glass fiber aerogel thermal insulation mat, and the preparation steps are described as follows:

Example 7.1 Preparation of Functionalized Silica Aerogel

In the preparation of the functionalized silica aerogel, the inclusion with β-CD solution was not adopted.

The following raw materials, in parts by weight, were used for preparation of the functionalized silica aerogel:

10 parts of silane coupling agent KH-570, 250 parts of silica sol (25% $SiO_2$), 10 parts of aminoadamantane and 250 parts of halloysite nanotubes.

Preparation process: (1) The aminoadamantane and the silane coupling agent KH-570 were premixed to obtain a premix; the premix was added slowly to the silica sol, a resulting system was heated to 60° C. and held for 2 h with stirring for reaction; during the reaction, the alkoxy groups (—OCH₃) of the silane coupling agent condensed with the silicon hydroxyl groups (—SiOH) on the surface of the silica sol, such that the amino-adamantane molecules were grafted to the surface of the silica sol particles to form an "aminoadamantane-silica sol" complex;

(2) The halloysite nanotubes were added to the "aminoadamantane-silica sol" complex obtained in the step (1), and a resulting mixture was stirred thoroughly for gelation to obtain a wet gel;

(3) The wet gel was subjected to low-temperature drying to obtain a functionalized silica aerogel.

Example 7.2 Preparation of Composite Slurry

The composite slurry was prepared by using the functionalized silica aerogel prepared in Example 7.1, and the remaining raw materials and preparation steps are the same as those in Example 1.2.

Example 7.3 Preparation of glass fiber aerogel thermal insulation mat: The glass fiber aerogel thermal insulation mat was prepared by using the composite slurry prepared in Example 7.2, and the preparation process is the same as that in Example 1.3.

Example 8: This example provides a glass fiber aerogel thermal insulation mat, and the preparation steps are described as follows:

Example 8.1 Preparation of Functionalized Silica Aerogel

In the preparation of the functionalized silica aerogel, no aminoadamantane was added.

Preparation Process:

(1) A saturated aqueous solution of β-CD was prepared, and halloysite nanotubes were then added to the saturated aqueous solution of β-CD and dispersed with ultrasonic waves to form a "β-CD-HNTs" complex;

(2) Silane coupling agent KH-570 was added to the silica sol, and the silica sol was then heated to 60° C. and stirred for 2 h, the "β-CD-HNTs" complex obtained in the step (1) was then added to the silica sol, and a resulting mixture was stirred thoroughly for gelation to obtain a wet gel;

(3) The wet gel was subjected to low-temperature drying to obtain the functionalized silica aerogel.

The remaining raw materials and preparation steps are the same as those in Example 1.1.

Example 8.2 Preparation of Composite Slurry

The composite slurry was prepared by using the functionalized silica aerogel prepared in Example 8.1, and the remaining raw materials and preparation steps are the same as those in Example 1.2.

Example 8.3 Preparation of glass fiber aerogel thermal insulation mat: The glass fiber aerogel thermal insulation mat was prepared by using the composite slurry prepared in Example 8.2, and the preparation process is the same as that in Example 1.3.

Example 9: This example provides a glass fiber aerogel thermal insulation mat, and the preparation steps are described as follows:

Example 9.1 Preparation of Functionalized Silica Aerogel

In the preparation of the functionalized silica aerogel, no silane coupling agent KH-570 was added.

(1) A saturated aqueous solution of β-CD was prepared, and halloysite nanotubes were then added to the saturated aqueous solution of β-CD and dispersed with ultrasonic waves to form a "β-CD-HNTs" complex;

(2) Aminoadamantane was added to silica sol, and the silica sol was then heated to 60° C. and stirred for 2 h, the "β-CD-HNTs" complex obtained in the step (1) was then added to the silica sol, and a resulting mixture was stirred thoroughly for gelation to obtain a wet gel;

(3) The wet gel was subjected to low-temperature drying to obtain the functionalized silica aerogel.

The remaining raw materials and preparation steps are the same as those in Example 1.1.

Example 9.2 Preparation of Composite Slurry

The composite slurry was prepared by using the functionalized silica aerogel prepared in Example 9.1, and the remaining raw materials and preparation steps are the same as those in Example 1.2.

Example 9.3 Preparation of glass fiber aerogel thermal insulation mat: The glass fiber aerogel thermal insulation mat was prepared by busing the composite slurry prepared in Example 9.2, and the preparation process is the same as that in Example 1.3.

Example 10: This example provides a glass fiber aerogel thermal insulation mat, and the preparation steps are described as follows:

Example 10.1 Preparation of Functionalized Silica Aerogel

Raw materials, in percent by weight: 5% of halloysite nanotubes, 5% of pentafluorophenyl methacrylate, and a balance of silica sol (25% $SiO_2$).

Preparation Process:

(1) Halloysite nanotubes was mixed with pentafluorophenyl methacrylate, and ultrasonic dispersion was performed for 30 min to complete surface modification to obtain modified nanotubes.

(2) The modified nanotubes were added to silica sol and a resulting mixture was stirred thoroughly for gelation; then, aging, methanol solvent exchange and $CO_2$ supercritical drying were performed to obtain a functionalized silica aerogel.

The remaining raw materials and preparation steps are the same as those in Example 1.

Example 10.2 Preparation of composite slurry: The composite slurry was prepared by using the functionalized silica aerogel prepared in Example 10.1, 0.8% methyltrimethoxysilane in Example 1.2 was replaced with 0.8% vinyltrimethoxysilane, and the remaining raw materials and preparation steps are the same as those in Example 1.2.

Example 10.3 Preparation of glass fiber aerogel thermal insulation mat: The glass fiber aerogel thermal insulation mat was prepared by using the composite slurry prepared in Example 10.2, and the preparation process is the same as that in Example 1.3.

Example 11: This example provides a glass fiber aerogel thermal insulation mat, and the preparation steps are described as follows:

Example 11.1 Preparation of Functionalized Silica Aerogel

Raw materials, in percent by weight: 5% of halloysite nanotubes, 5% of dodecyl methacrylate, and a balance of silica sol (25% $SiO_2$).

14

Preparation Process:

(1) Halloysite nanotubes were mixed with dodecyl methacrylate, and ultrasonic dispersion was performed for 30 min to complete surface modification to obtian modified nanotubes.

(2) The modified nanotubes were added to silica sol and a resulting mixture was stirred thoroughly for gelation; then, aging, methanol solvent exchange and $CO_2$ supercritical drying were performed to obtain a functionalized silica aerogel.

The remaining raw materials and preparation steps are the same as those in Example 1.

Example 11.2 Preparation of composite slurry: The composite slurry was prepared by using the functionalized silica aerogel prepared in Example 11.1, 0.8% methyltrimethoxysilane in Example 1.2 was replaced with 0.4% methyltrimethoxysilane and 0.4% vinyltrimethoxysilane, and the remaining raw materials and preparation steps are the same as those in Example 1.2.

Example 11.3 Preparation of glass fiber aerogel thermal insulation mat: The glass fiber aerogel thermal insulation mat was prepared by using the composite slurry prepared in Example 11.2, and the preparation process is the same as that in Example 1.3.

Comparative Example 1: This comparative example provides a glass fiber aerogel thermal insulation mat, and the preparation steps are described as follows:

Comparative Example 1.1 Unfunctionalized Silica Aerogel

An ordinary unfunctionalized silica aerogel was used to replace the functionalized silica aerogel in Example 1.1.

Comparative Example 1.2 Preparation of Composite Slurry

The composite slurry was prepared by using the unfunctionalized silica aerogel in Comparative Example 1.1, and the remaining raw materials and preparation steps are substantially the same as those in Example 1.2. The only difference lies in that in the preparation process of the composite slurry, high-shear dispersion was performed at 1800 r/min in the step (2), and the stirring time was increased to 30 min due to the decreased dispersibility of the ordinary silica aerogel.

Comparative Example 1.3 Preparation of glass fiber aerogel thermal insulation mat: The glass fiber aerogel thermal insulation mat was prepared by using the composite slurry prepared in Comparative Example 1.2, and the preparation process is the same as that in Example 1.3.

Performance Test:

I. 30-Minute Burn-Through Resistance Test for Thermal Insulation Materials

Test samples: glass fiber aerogel thermal insulation mats prepared in Examples 1-11 and Comparative Example 1;

Test method: GB/T25352-2010;

Test equipment: Oil burner;

Flame temperature (C): 1022-1044;

Fuel oil parameters: Flow rate: (6.0-6.2) gph; Pressure: (100~120) psi; Temperature: (0-11° C.);

Air parameters: Pressure: (63-67) psi; Temperature: (4-16° C.);

Sample pretreatment: Temperature: 21.9° C.-22.8° C.; Humidity: 51%-62%; Time: 25 h.

Test Data:

TABLE 1

Burn-through resistance test results of the glass fiber aerogel insulation mats prepared in Examples 1-11 and Comparative Example 1

| Sample | Burn-through status and occurrence time(s) | Max. backside heat flux (W/cm$^2$) and occurrence time(s) |
|---|---|---|
| Example 1 | Not burned through | Left: 0.63/1790; Right: 0.67/1793 |
| Example 2 | Not burned through | Left: 0.69/1788; Right: 0.70/1796 |
| Example 3 | Not burned through | Left: 0.65/1798; Right: 0.68/1800 |
| Example 4 | Not burned through | Left: 0.93/1772; Right: 0.89/1789 |
| Example 5 | Not burned through | Left: 0.81/1785; Right: 0.79/1796 |
| Example 6 | Not burned through | Left: 0.89/1745; Right: 0.85/1777 |
| Example 7 | Not burned through | Left: 0.89/1788; Right: 0.85/1786 |
| Example 8 | Not burned through | Left: 0.82/1760; Right: 0.79/1780 |
| Example 9 | Not burned through | Left: 0.84/1760; Right: 0.81/1780 |
| Example 10 | Not burned through | Left: 0.86/1757; Right: 0.87/1779 |
| Example 11 | Not burned through | Left: 0.88/1747; Right: 0.89/1791 |
| Comparative Example 1 | Not burned through, but edges are carbonized | Left: 1.35/1700; Right: 1.30/1720 |

It can be seen from the data in Table 1 that: the glass fiber aerogel thermal insulation mats obtained in Examples 1-3 were not burned through within 30 min and remained structurally intact; although the thermal insulation mats obtained in Examples 4-11 were also not burned through within 30 min, their heat flux values were significantly higher than those of the mats in Examples 1-3; the thermal insulation mat obtained in Comparative Example 1 was not burned through but exhibited edge carbonization, with a heat flux value reaching 1.30 W/cm$^2$.

The reason for the above results is analyzed as follows: The backside heat flux values of the thermal insulation mats obtained in Examples 1-3 were all below 0.7 W/cm$^2$, and the key factor is that the functionalized silica formed a dynamic cross-linked network through the inclusion of aminoadamantane by β-cyclodextrin (β-CD), which effectively blocked the heat conduction paths. In addition, the dual coupling agent improved the structural compactness.

For Example 4 wherein a single coupling agent was used, the single silane coupling agent failed to bond with the functionalized silica aerogel, resulting in a high interfacial thermal resistance and a significant increase in heat conduction efficiency. This may be the reason for a heat flux value significantly higher than those of Examples 1-3.

Example 5 did not involve internal hydrophobization treatment, so the internal pores were not hydrophobized. After water absorption, the thermal conductivity of the aerogel increased, and structural expansion caused an increase in pore defects, resulting in a heat flux value higher than those of Examples 1-3.

Examples 6 and 7 did not involve β-CD inclusion, resulting in lack of a dynamic cross-linked network. This causes a failure to inhibit the propagation of microcracks at high temperatures and an increase in heat conduction paths, resulting in a heat flux value significantly higher than those of Examples 1-3.

For Examples 8 and 9, relatively high heat flux values may be resulted in by the uneven dispersion of aerogel particles, the loose structure of the composite, and intensified heat transfer caused by air convection.

For Comparative Example 1 wherein ordinary silica aerogel was used, the ordinary silica aerogel has strong water absorption and water evaporation at high temperatures forms water vapor channels, leading to an increase in thermal conductivity.

It can be concluded therefrom that the compactness of the structure constructed by the dual coupling agent, as well as the construction of a dynamically reversible cross-linked network inside the aerogel by the host-guest inclusion interaction between β-CD and aminoadamantane in the functionalized silica aerogel, are the key factors for the improvement of thermal insulation performance.

II. Mechanical Property Test

1. Tensile strength and elongation at break: Five specimens with dimensions of 100 mm×20 mm were cut out from each of the glass fiber aerogel thermal insulation mats prepared in Examples 1-11 and Comparative Example 1. A universal material testing machine was used to conduct tensile tests on the samples at a tensile speed of 5 mm/min. The maximum tensile force and elongation at breaks of the samples were recorded to calculate the tensile strength (unit: MPa) and elongation at break (unit: %).

2. Flexural strength: Five samples with dimensions of 100 mm×20 mm were cut out from each of the glass fiber aerogel thermal insulation mats prepared in Examples 1-11 and Comparative Example 1. The three-point bending test method was performed on a universal material testing machine, with a span of 60 mm and a loading speed of 1 mm/min. The maximum loads at breaks of the samples was recorded to calculate the flexural strength (unit: MPa).

3. Test results

TABLE 2

Mechanical property test results of glass fiber aerogel thermal insulation mats prepared in Examples 1-11 and Comparative Example 1

| Sample | Tensile strength (MPa) | Elongation at break (%) | Flexural strength (MPa) |
|---|---|---|---|
| Example 1 | 3.62 ± 0.04 | 17.0 ± 1.1 | 2.91 ± 0.16 |
| Example 2 | 3.51 ± 0.06 | 16.5 ± 1.0 | 2.75 ± 0.15 |
| Example 3 | 3.41 ± 0.05 | 16.0 ± 1.2 | 2.82 ± 0.18 |
| Example 4 | 2.98 ± 0.07 | 13.0 ± 0.9 | 2.40 ± 0.18 |
| Example 5 | 3.30 ± 0.08 | 15.5 ± 0.8 | 2.70 ± 0.15 |
| Example 6 | 2.96 ± 0.08 | 13.5 ± 0.8 | 2.35 ± 0.15 |
| Example 7 | 3.01 ± 0.09 | 14.0 ± 0.7 | 2.30 ± 0.16 |
| Example 8 | 2.78 ± 0.08 | 13.8 ± 0.6 | 2.35 ± 0.17 |
| Example 9 | 2.65 ± 0.06 | 13.5 ± 0.8 | 2.30 ± 0.12 |
| Example 10 | 2.60 ± 0.08 | 12.5 ± 0.6 | 2.20 ± 0.14 |
| Example 11 | 2.71 ± 0.06 | 11.9 ± 0.7 | 2.18 ± 0.12 |
| Comparative Example 1 | 2.20 ± 0.05 | 11.0 ± 0.5 | 2.10 ± 0.10 |

It can be seen from the test data in Table 2 that:

Compared with the glass fiber aerogel thermal insulation mat obtained in Comparative Example 1 wherein commercially available ordinary silica aerogel was used, all the glass fiber aerogel thermal insulation mats obtained in Examples 1-11 exhibited improved mechanical properties, which highlights the revolutionary enhancement of the interfacial properties of aerogel by the modification process; and chemical modification can improve the interfacial bonding strength.

Analysis of the mechanical property test results shows that the glass fiber aerogel thermal insulation mats obtained in Examples 1-3 and Example 5 had significantly better mechanical properties than those in the other examples, which indicates that the adoption of the dual coupling agent and the β-CD-HNTs-aminoadamantane structure significantly enhanced the interfacial bonding force between glass fibers and aerogel, giving the materials with flexibility and improving their compressive strength, tensile capacity and tear resistance.

A single coupling agent was used in Example 1, and Examples 1-3, which adopted the dual coupling agents, produced glass fiber aerogel thermal insulation mats of which the mechanical property test results superior to those in Example 4. This is probably because the single silane coupling agent can only form Si—O bonds with the hydroxyl groups (—OH) on the glass fiber surface by alkoxy groups (—OCH₃), but cannot react effectively with the acidic groups (e.g., silicon hydroxyl groups) on the aerogel surface, resulting in the formation of only a physical adsorption layer at the fiber-aerogel interface and insufficient shear strength. In contrast, the dual coupling agents in Examples 1-3 can synergistically enhance the interfacial bonding force, and the titanate coupling agent can improve the chemical cross-linking density between aerogel and resin, thereby optimizing the mechanical properties of the produced glass fiber aerogel thermal insulation mats.

Methyltrimethoxysilane was not added in Example 5, while the methyltrimethoxysilane was incorporated in Examples 1-3 by comparison; therefore, the mechanical property test results of the glass fiber aerogel thermal insulation mats obtained in Examples 1-3 were superior to those in Example 5.

In the preparation of the functionalized silica aerogel in Example 6, methacrylate-based modification, instead of the β-CD inclusion process, was used; on the contrary, Examples 1-3 employed the β-CD inclusion process in comparison with Example 6, leading to a significant improvement in the mechanical properties methacrylate-based in Examples 1-3.

In the preparation of the functionalized silica aerogel in Example 7, the inclusion with β-CD solution was omitted, and aminoadamantane, silica sol and halloysite nanotubes were directly mixed. Examples 1-3 adopted the β-CD inclusion process as opposed to Example 7, thus achieving a significant improvement in mechanical properties. The reason for this is that:

in Examples 1-3, aminoadamantane was included in the cyclic cavities of β-CD, forming "dynamic cross-linking nodes" inside the aerogel; whereas Example 7 lacked the cyclic cavities of β-CD for including aminoadamantane, and no dynamic cross-linking nodes were formed inside the aerogel, and stress concentration easily happened under force, thereby leading to the rapid propagation of microcracks. A comparison of the data of Examples 1-3 with the data of Example 7 shows that β-CD inclusion is the core for constructing a multi-level anchoring structure, which enhances the interfacial synergistic deformation capacity through host-guest interaction.

In the preparation of the functionalized silica aerogel in Examples 8 and 9, aminoadamantane or silane coupling agent was not used; in comparison with Examples 8 and 9, Examples 1-3 employed aminoadamantane or a silane coupling agent, resulting in a significant improvement in the mechanical properties of the glass fiber aerogel thermal insulation mats obtained in Examples 1-3. This is because in Examples 1-3, aminoadamantane was grafted onto the surface of silica sol and formed host-guest inclusion with β-CD, rendering the aerogel structure compact, reducing internal pore defects and improving load-bearing capacity. In contrast, the mechanical properties of the glass fiber aerogel thermal insulation mats obtained in Examples 8 and 9 were inferior to those in Examples 1-3. The probable reason is that no aminoadamantane was grafted onto the surface of silica sol and host-guest inclusion with β-CD will not happen, resulting in a loose aerogel structure, an increase in internal pore defects and a decrease in load-bearing capacity. A comparison of the data of Examples 1-3 with the data of Examples 8-9 indicates that the grafting of aminoadamantane and the treatment with silane coupling agent have dual effects on improving the compactness of aerogel and the interfacial bonding to fibers.

In summary, for Examples 1-3, the key factors contributing to the improved thermal insulation performance are the compactness of the structure constructed by the dual coupling agents, as well as the formation of a dynamically reversible cross-linked network inside the functionalized silica aerogel by the host-guest inclusion interaction between β-CD and aminoadamantane.

III. Anti-Powder-Shedding Performance

1. Test samples: Samples of glass fiber aerogel thermal insulation mats prepared in Examples 1-11 and Comparative Example 1 were taken with identical dimensions, and three replicates were prepared for each sample for parallel testing to improve the accuracy and reliability of the test results.

2. Test equipment: The powder shedding rate testing device consists of a sealed box, a vibration device, a dust collector and an electronic balance.

3. Test procedures (1) The initial mass of each sample was weighed with an electronic balance and recorded accurately.

(2) The samples were placed into the sealed box of the powder shedding rate testing device, the vibration frequency and the vibration time were set to 50 Hz and 60 min respectively, and the vibration device and the dust collector are started to initiate the test.

(3) After the test, the mass of the collected dust was weighed with an electronic balance and recorded.

(4) The above test procedures were repeated for each sample for a total of three tests.

4. Data processing and calculation: The powder shedding rate was calculated for each test according to the formula: powder shedding rate (%)=(mass of collected dust/initial mass of sample)×100%. The average value of the three test results for each sample was taken as the final powder shedding rate of the sample.

5. Test data

TABLE 3

Anti-powder-shedding performance test results of glass fiber aerogel thermal insulation mats prepared in Examples 1-11 and Comparative Example 1

| Sample | Initial sample mass (g) | Mass of dust after first vibration (g) | Mass of dust after second vibration (g) | Mass of dust after third vibration (g) | Average mass of dust (g) | Powder shedding rate (%) |
|---|---|---|---|---|---|---|
| Example 1 | 50.000 | 0.120 | 0.100 | 0.080 | 0.100 | 0.20 |
| Example 2 | 50.000 | 0.140 | 0.120 | 0.100 | 0.120 | 0.24 |
| Example 3 | 50.000 | 0.200 | 0.120 | 0.130 | 0.150 | 0.30 |
| Example 4 | 50.000 | 0.300 | 0.250 | 0.200 | 0.250 | 0.50 |
| Example 5 | 50.000 | 0.250 | 0.210 | 0.170 | 0.210 | 0.42 |

TABLE 3-continued

Anti-powder-shedding performance test results of glass fiber aerogel
thermal insulation mats prepared in Examples 1-11 and Comparative Example 1

| Sample | Initial sample mass (g) | Mass of dust after first vibration (g) | Mass of dust after second vibration (g) | Mass of dust after third vibration (g) | Average mass of dust (g) | Powder shedding rate (%) |
|---|---|---|---|---|---|---|
| Example 6 | 50.000 | 0.500 | 0.400 | 0.300 | 0.400 | 0.80 |
| Example 7 | 50.000 | 0.550 | 0.400 | 0.400 | 0.450 | 0.90 |
| Example 8 | 50.000 | 0.400 | 0.350 | 0.300 | 0.350 | 0.70 |
| Example 9 | 50.000 | 0.500 | 0.400 | 0.450 | 0.450 | 0.9 |
| Example 10 | 50.000 | 0.550 | 0.450 | 0.350 | 0.450 | 0.90 |
| Example 11 | 50.000 | 0.500 | 0.450 | 0.300 | 0.420 | 0.84 |
| Comparative Example 1 | 50.000 | 0.800 | 0.650 | 0.500 | 0.650 | 1.30 |

It can be seen from the test data in Table 3 that:

Compared with the glass fiber aerogel thermal insulation mat obtained in Comparative Example 1 wherein commercially available ordinary silica aerogel was used, the glass fiber aerogel thermal insulation mats obtained in Examples 1-11 exhibited significantly reduced powder shedding rates, which highlights the disruptive improvement of the interfacial properties of aerogel by the modification process.

The powder shedding rates of the glass fiber aerogel thermal insulation mats obtained in Examples 1-3 were significantly lower than those in Examples 4-11 and Comparative Example 1. This indicates that the technical solutions adopted in Examples 1-3, such as the modification of silica aerogel by β-CD solution inclusion, the dual coupling agent system and the internal hydrophobization treatment, can effectively reduce the powder shedding rate of glass fiber aerogel thermal insulation mats and improve the stability and reliability of the products.

A single coupling agent was used in Example 4, and Examples 1-3, which adopted the dual coupling agents, produced glass fiber aerogel thermal insulation mats of which the powder shedding rates were lower than the powder shedding rate of the glass fiber aerogel thermal insulation mat obtained in Example 4. Examples 1-3 employed dual coupling agents, where the titanate coupling agents exerted an "anchoring and bridging" effect, gives strong binding force between particles, realizes bonding with glass fibers and also forms effective anchoring with aerogel particles, thus achieving a tight connection between aerogel particles and the resin matrix and preventing shedding during vibration. In contrast, in Example 4, only a single silane coupling agent was used and the silane coupling agent does not have the "anchoring and bridging" effect of the titanate coupling agent. This resulted in insufficient binding force between particles, and the silane coupling agent only bonded with glass fibers but failed to form effective anchoring with aerogel particles, leading to micron-scale gaps between aerogel particles and the resin matrix and easily causing shedding during vibration. A comparison of the data of Examples 1-3 with the data of Example 4 demonstrates the necessity of the dual coupling agents for synergistically enhancing interfacial adhesion. The titanate coupling agent can "weld" aerogel particles to the fiber surface, thereby reducing the risk of shedding.

No methyltrimethoxysilane was added in Example 5, while the methyltrimethoxysilane was incorporated in Examples 1-3, and the powder shedding rates of the glass fiber aerogel thermal insulation mats obtained in Examples 1-3 were significantly lower than that of the glass fiber aerogel thermal insulation mat obtained in Example 5. This is because the methyltrimethoxysilane, added in Examples 1-3, can fundamentally inhibit powder shedding caused by water absorption. In contrast, the absence of internal hydrophobization treatment in Example 5 resulted in the unhydrophobized internal pores of the aerogel. The infiltration of moisture triggered a swelling-shrinking cycle of aerogel particles, which weakened the interfacial adhesion. A comparison of the data of Examples 1-3 with the data of Example 5 demonstrates the pivotal role of the "internal hydrophobic framework" in structural stability, and the methyltrimethoxysilane can fundamentally inhibit powder shedding caused by water absorption.

In the preparation of the functionalized silica aerogel in Example 6, methacrylate-based modification, instead of the β-CD inclusion process, was used. In contrast to Example 6, the β-CD inclusion process was used in Examples 1-3, and the powder shedding rates of the glass fiber aerogel thermal insulation mats obtained in Examples 1-3 were significantly lower than that of the glass fiber aerogel thermal insulation mat obtained in Example 6. This is because the β-CD inclusion process was employed in Examples 1-3. Unlike the rigid cross-linked network formed by methacrylate-based modification, the dynamically reversible inclusion interaction between β-CD and aminoadamantane prevents brittle fracture under stress. However, the methacrylate-based modification in Example 6 formed a rigid cross-linked network, but failed to achieve the dynamically reversible inclusion interaction between β-CD and aminoadamantane. The network was prone to brittle fracture under stress to release aerogel particles. In addition, the halloysite nanotubes were not coated with β-CD, and surface hydroxyl groups were not activated. The halloysite nanotubes were only physically entangled with aerogel particles, thus resulting in shedding during vibration.

In the preparation of the functionalized silica aerogel in Example 7, the inclusion with β-CD solution was omitted, and aminoadamantane, silica sol and halloysite nanotubes were directly mixed. Examples 1-3 adopted the β-CD inclusion process as opposed to Example 7, and the powder shedding rates of the glass fiber aerogel thermal insulation mats obtained in Examples 1-3 were significantly lower than that of the glass fiber aerogel thermal insulation mat obtained in Example 7. A comparison of the data of Examples 1-3 with the data of Example 7 indicates that β-CD inclusion is the core for constructing a compact structure, the β-CD inclusion increases the interparticle binding energy and reduces the powder shedding rate through host-guest interactions.

In the preparation of the functionalized silica aerogel in Examples 8 and 9, neither aminoadamantane nor silane coupling agent was used. In comparison with Examples 8 and 9, Examples 1-3 employed aminoadamantane or a silane coupling agent, and the powder shedding rates of the glass fiber aerogel thermal insulation mats obtained in Examples 1-3 were significantly lower than those of the glass fiber aerogel thermal insulation mats obtained in Examples 8 and 9. Aminoadamantane was grafted onto the surface of silica sol in Examples 1-3. The grafting of aminoadamantane and the silane coupling agent together improve the interfacial bonding density, and the synergy thereof can form a "multi-point anchoring" structure. In contrast, no aminoadamantane was grafted onto the surface of silica sol in Examples 8 and 9, leading to the "island-like" dispersion of aerogel particles and a reduction in the interfacial bonding area. Moreover, the lack of hydrophobic modification of glass fibers with silane coupling agents resulted in weak chemical bonding between the hydroxyl groups on the fiber surface and the aerogel, causing particles to easily slip and shed in the axial direction of the fibers. It is emphasized that the grafting of aminoadamantane and the treatment with silane coupling agents play a critical role in improving the interfacial bonding density, and the synergy thereof can form a "multi-point anchoring" structure.

The above are only preferred embodiments of the application and are not intended to limit the application in any form. Although the present application is disclosed as above by preferred embodiments, the preferred embodiments are not for the purpose of defining the present application. Any person skilled in the art, without departing from the scope of the technical solutions of the present application, shall make some changes or modifications using the technical content disclosed as equivalent embodiments of the equivalent changes. However, any simple modification, equivalent change and modification of the above embodiments made on the basis of the technical solutions of the present application, without departing from the content of the technical solutions of the present application, shall fall within the scope of the technical solutions of the present application.

What is claimed is:

1. A composite slurry, wherein the composite slurry comprises the following components in percent by weight:
   18%-22% of a functionalized silica aerogel;
   32%-38% of an inorganic silicate-modified resin;
   3%-5% of chopped glass fibers;
   0.3%-0.5% of a dual coupling agent;
   0.3%-0.5% of a nanoclay dispersion;
   0.1%-0.3% of a defoamer;
   0.2%-0.6% of a wetting agent;
   0.5%-1.0% of at least one of methyltrimethoxysilane or vinyltrimethoxysilane; and
   a balance of water.

2. The composite slurry according to claim 1, wherein the dual coupling agent is prepared from a silane coupling agent and a titanate coupling agent at a weight ratio of (1-3):1.

3. The composite slurry according to claim 1, wherein the dual coupling agent is prepared from γ-aminopropyltriethoxysilane and pyrophosphate-type monoalkoxy titanate at a weight ratio of 2:1.

4. The composite slurry according to claim 1, wherein the inorganic silicate-modified resin is a sodium silicate-modified phenolic resin.

5. The composite slurry according to claim 1, wherein the functionalized silica aerogel is prepared by using β-cyclodextrin (β-CD), a silane coupling agent, silica sol, aminoadamantane and halloysite nanotubes (HNTs).

6. The composite slurry according to claim 5, wherein a mass ratio of the aminoadamantane to the silane coupling agent to the silica sol is 1:1:(20-30); a mass ratio of the β-CD to the HNTs is 1:(20-30).

7. The composite slurry according to claim 6, wherein a method for preparing the functionalized silica aerogel comprises the following steps:
   S1, premixing the aminoadamantane and the silane coupling agent to obtain a premix; then, adding the premix to the silica sol and stirring to form an "aminoadamantane-silica sol" complex;
   S2, preparing a saturated aqueous solution of the β-CD, and mixing the saturated aqueous solution of the β-CD with the HNTs to form a "β-CD-HNTs" complex; and
   S3, mixing the "aminoadamantane-silica sol" complex with the "β-CD-HNTs" complex and stirring to form a wet gel; and
   drying the wet gel to obtain the functionalized silica aerogel.

8. The composite slurry according to claim 1, wherein raw materials for preparing the functionalized silica aerogel comprise:
   halloysite nanotubes;
   at least one of dodecyl methacrylate or pentafluorophenyl methacrylate; and
   silica sol with a $SiO_2$ content of 25%.

9. The composite slurry according to claim 1, wherein a method for preparing the composite slurry comprises the following steps:
   T1, preparing raw materials according to the weight percent of each component;
   T2, mixing and dispersing the water, the inorganic silicate-modified resin and the functionalized silica aerogel to form a homogeneous base material;
   T3, adding the chopped glass fibers and the nanoclay dispersion to the homogeneous base material, performing shear dispersion, and then adding the dual coupling agent and stirring to obtain a mixture; and
   T4, adding the at least one of the methyltrimethoxysilane or the vinyltrimethoxysilane, the defoamer and the wetting agent to the mixture, and adjusting a viscosity of a resulting slurry to 25-30 mPa·s and a pH value of the resulting slurry to 9-9.5 to obtain the composite slurry.

10. An aerogel thermal insulation mat, wherein the aerogel thermal insulation mat is prepared by coating the composite slurry according to claim 1 on a fiber mat, followed by sintering.

11. The aerogel thermal insulation mat according to claim 10, wherein the fiber mat is one of a glass fiber mat, a carbon fiber mat, a nickel fiber mat, a stainless steel fiber mat, an aluminum silicate fiber mat, a ceramic fiber mat, an alumina fiber mat, a basalt fiber mat or a polyacrylonitrile fiber mat.

12. The aerogel thermal insulation mat according to claim 10,
   wherein a thickness of the fiber mat is 0.5 mm to 500 mm.

13. A method for preparing the aerogel thermal insulation mat according to claim 10, wherein the method comprises the following steps:
   (1) pre-wetting the fiber mat to obtain a pre-wet fiber mat;
   (2) placing the pre-wet fiber mat in an environment with a vacuum degree of −0.08 MPa to −0.1 MPa, and impregnating the composite slurry so that a penetration amount of the composite slurry reaches pores of the fiber mat; then, controlling a coating amount of the composite slurry on a surface of the fiber mat to be 1000-1200 $g/m^2 \cdot mm$ by means of extrusion to obtain an impregnated fiber mat;

(3) sintering the impregnated fiber mat;

(4) performing surface hydrophobization treatment; and (5) performing drying to obtain the aerogel thermal insulation mat.

14. The aerogel thermal insulation mat according to claim 13, wherein the surface hydrophobization treatment in the step (4) uses an emulsion containing a mixture of silane and siloxane with a volume concentration of 5% as a hydrophobing agent.

* * * * *